A. SWEETLAND.
Improvement in Hames-Fasteners.
No. 115,908.
Patented June 13, 1871.
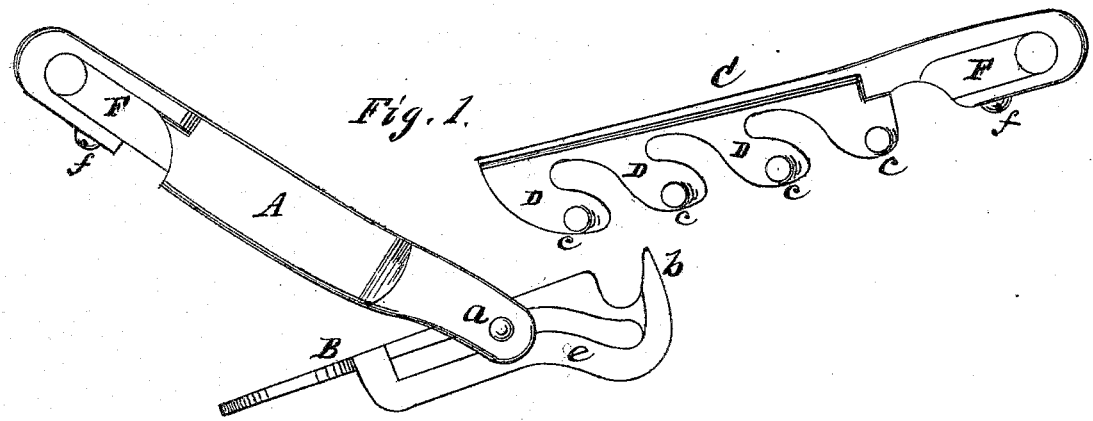
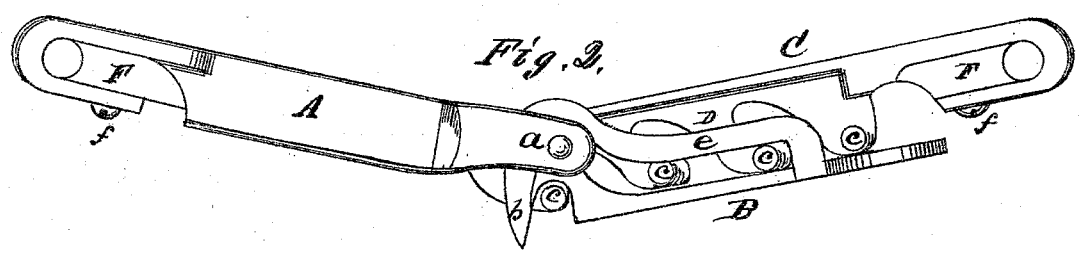
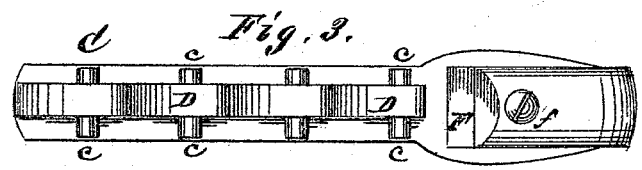
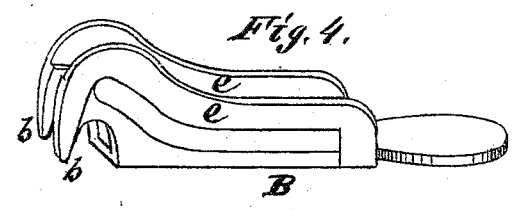

UNITED STATES PATENT OFFICE.

ALVAH SWEETLAND, OF SYRACUSE, NEW YORK.

IMPROVEMENT IN HAMES-FASTENERS.

Specification forming part of Letters Patent No. 115,908, dated June 13, 1871.

*To all whom it may concern:*

Be it known that I, ALVAH SWEETLAND, of Syracuse, in the county of Onondaga and State of New York, have invented a new and useful Improvement in Hame-Locks; and I do hereby declare that the following is a full, clear, and exact description thereof, which will enable others to make and use the same, reference being had to the accompanying drawing forming part of this specification, in which—

Figure 1 shows the parts in position for hooking, and Fig. 2 shows the same in the hooked and locked position. Figs. 3 and 4 are detail views.

Similar letters of reference indicate like parts in the several figures.

This invention consists in attaching to one of the hames a link carrying a slotted lever, which engages with a hooked bar attached to the opposite hame, the hooked bar having a series of lugs or projections, and the lever having side rails that fit over said lugs with a degree of elasticity, so that the lever is locked in position when closed and the liability of the parts to become disengaged, when relieved of strain, thereby obviated; and the invention also consists in attaching the parts to the hames by means of hooks, the throats of which are each filled up by a block, secured in place by a set-screw, so that the parts are readily applied, or changed to another harness, if desired, as hereinafter more fully described.

In the accompanying drawing, A is the link. B is the slotted lever, and C is the serrated or hooked bar. The bar C is made with a series of hooks, D, as shown in Fig. 1, and each hook is provided with a nib or lug, $c$, on each of its sides. The lever B terminates at one end with two hooks, $b\ b$, Fig. 1, which engage with any one pair of the nibs $c$ to carry the rivet or cross-bar $a$ over one of said hooks, D, as shown in Fig. 2. The lever B is made with two side rails, $e\ e$, Fig. 4, and as the lever is sprung into the closed position these rails $e\ e$, having a degree of elasticity, are sprung over one pair of the nibs $c$, and embrace them with a sufficient hold to securely lock the parts in the closed position, so that when going down hill, or at such time as the lock may be relieved of strain, the lever B cannot drop by its own weight and open the lock. The hooks by which the parts are attached to their hames have each a block, F, fitted into its throat, and held in place in a removable manner by a set-screw, $f$, by which the lock is easily applied, or removed to another harness at any time. A rivet can be used in place of the screw $f$. I, however, consider the screw as preferable, as it adds but slightly to the cost, and is removed with the least trouble.

Having thus described my invention, what I claim, and desire to secure by Letters Patent, is—

1. The link A, closing-lever B, and hooked bar C, the said bar C having nibs or projections $c\ c$, and the lever B having rails $e\ e$, that embrace said projections $c$ to lock the lever in the closed position, all constructed and arranged substantially as specified.

2. The detachable throat-blocks F $f$, in connection with the link A, lever B, and bar C, as and for the purpose described.

The above specification of my invention signed by me this 30th day of March, 1871.

ALVAH SWEETLAND.

Witnesses:
 R. B. STRONG,
 F. A. MORLEY.